United States Patent [19]

Schlemmer

[11] 4,454,000
[45] Jun. 12, 1984

[54] MOTORIZED TOOL FOR JOINING SELF ADHESIVE PLIES OF UNVULCANIZED RUBBER

[75] Inventor: Robert Schlemmer, Rome, Italy

[73] Assignee: The Firestone Tire & Rubber Company, Akron, Ohio

[21] Appl. No.: 525,361

[22] Filed: Aug. 22, 1983

[30] Foreign Application Priority Data

Mar. 21, 1983 [IT] Italy .................. 67313 A/83

[51] Int. Cl.³ ............................ B32B 31/20
[52] U.S. Cl. .................... 156/502; 156/544; 156/574; 156/579; 156/582
[58] Field of Search ............ 156/304.1, 304.6, 304.7, 156/502, 574, 579, 582, 544, 397, 906, 907

[56] References Cited

U.S. PATENT DOCUMENTS

| | | | |
|---|---|---|---|
| 1,436,023 | 11/1922 | Elmendorf | 156/544 |
| 1,924,551 | 8/1933 | Higgins | 156/391 |
| 2,348,803 | 5/1944 | Friz | 156/544 |
| 2,516,280 | 7/1950 | Welch | 156/166 |
| 2,556,476 | 6/1951 | Lamport | 156/391 |
| 2,702,070 | 2/1955 | Lindemann | 156/502 |
| 3,909,341 | 9/1975 | Moscovita | 156/502 |
| 4,231,836 | 11/1980 | Ljungqvist et al. | 156/502 |

FOREIGN PATENT DOCUMENTS

| | | |
|---|---|---|
| 1023216 | 7/1958 | Fed. Rep. of Germany . |
| 1061057 | 7/1959 | Fed. Rep. of Germany . |
| 1099718 | 2/1961 | Fed. Rep. of Germany . |
| 2624668 | 1/1977 | Fed. Rep. of Germany . |
| 2446170 | 8/1970 | France . |
| 607074 | 8/1948 | United Kingdom ............... 156/579 |
| 1374742 | 11/1974 | United Kingdom . |
| 1451831 | 10/1976 | United Kingdom . |

*Primary Examiner*—Michael G. Wityshyn
*Attorney, Agent, or Firm*—Ernst H. Ruf

[57] ABSTRACT

A motorized tool for joining self adhesive plies of unvulcanized rubber, the tool having a pincer-like structure provided with resilient means for urging a portion of a first arm of the pincer itself towards a portion of a second arm; the said portions supporting pairs of rolling bodies facing one another, and the rolling bodies carried by the said first arm being constituted by two discs converging towards one another and towards the other arm and provided with a peripheral crown of teeth meshing with one another, with one of said discs also meshing with an output pinion of a motor mounted within the said first arm.

5 Claims, 4 Drawing Figures

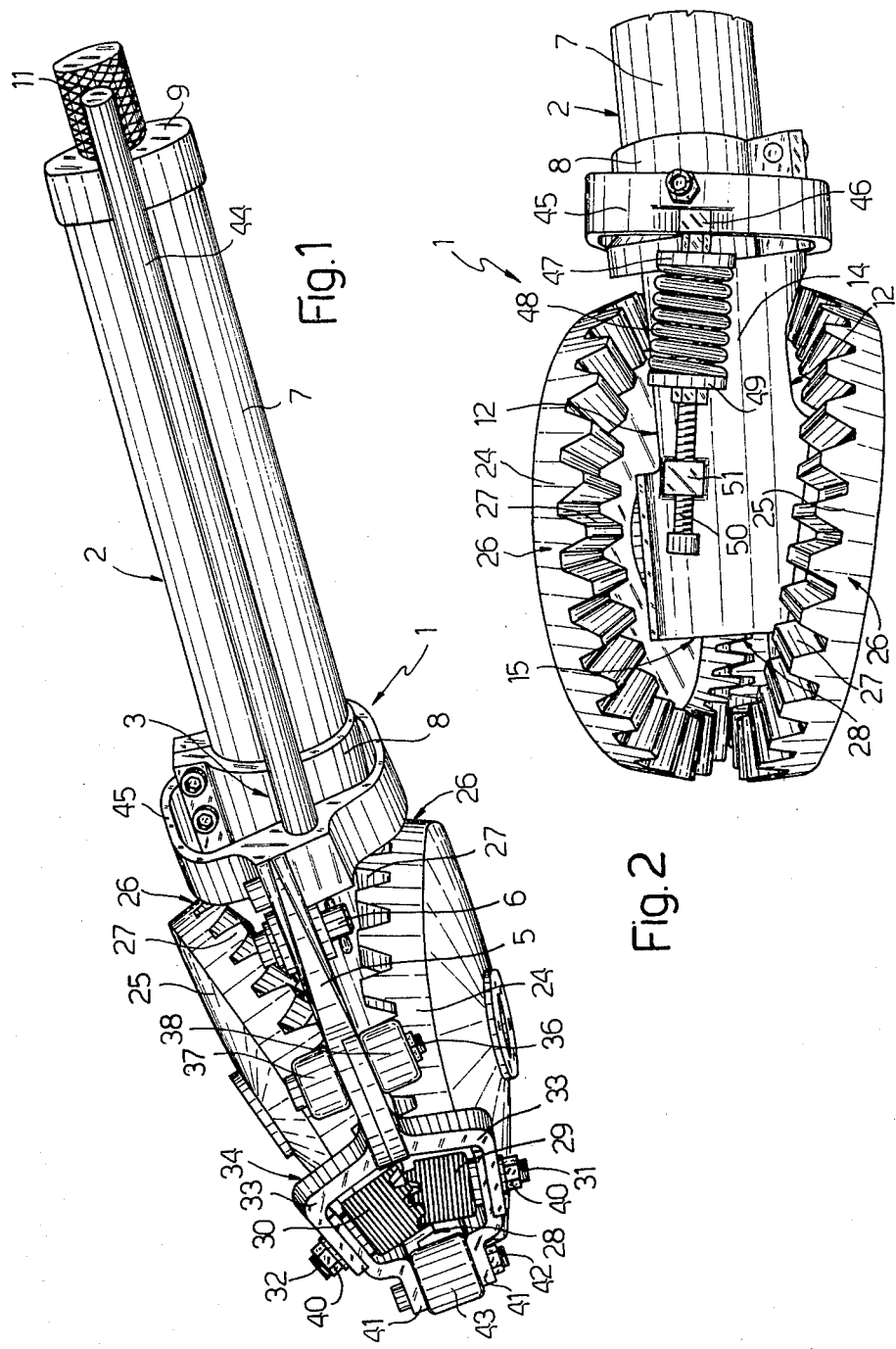

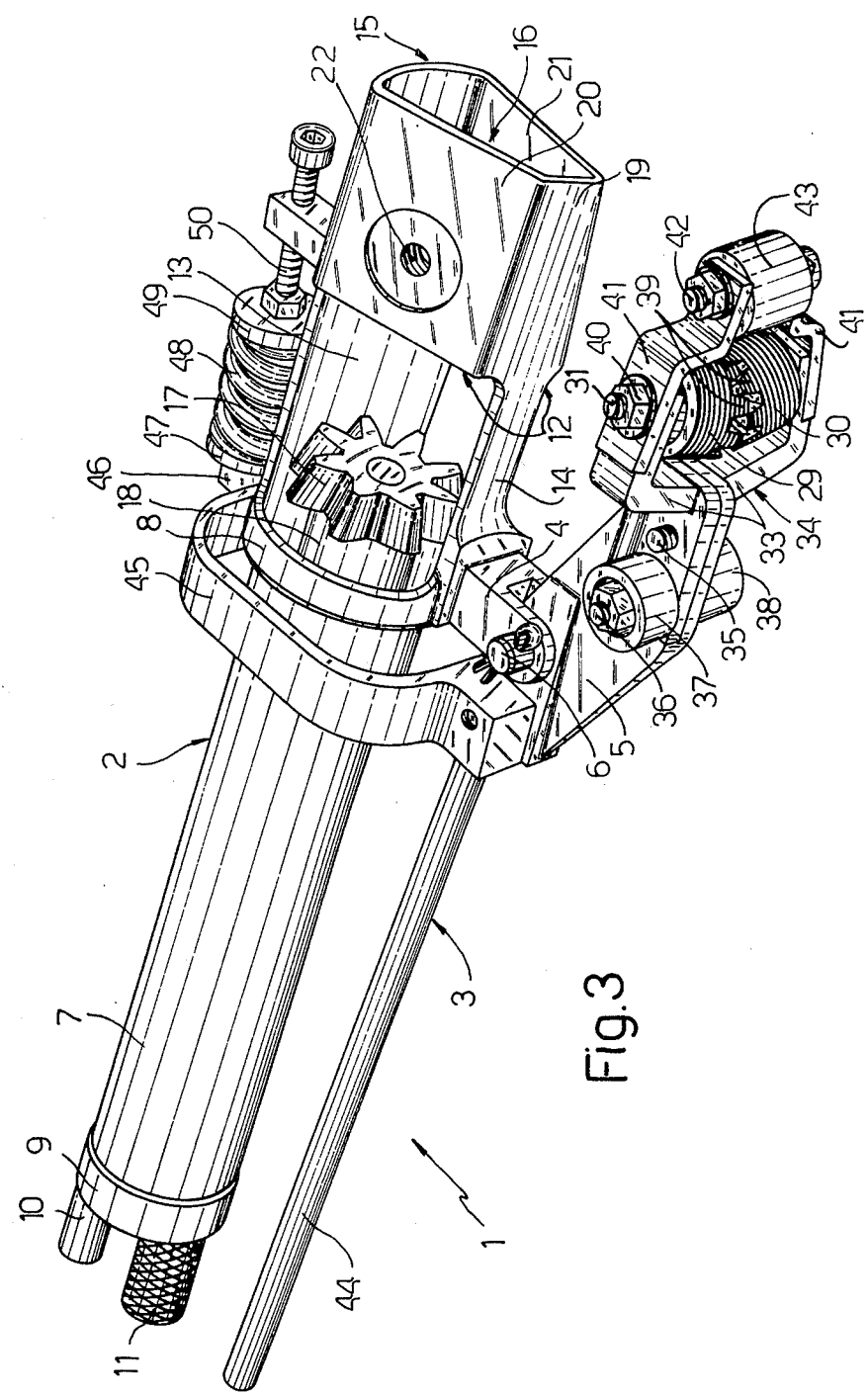

MOTORIZED TOOL FOR JOINING SELF ADHESIVE PLIES OF UNVULCANIZED RUBBER

TECHNICAL FIELD

The present invention relates to a motorized tool for joining the plies of tires and is particularly adapted to be used for connecting together the adjacent edges of a reinforced ply of a tire on a tire forming drum.

BACKGROUND OF THE ART

In general, during the forming of a tire it is known to utilize plies made of unvulcanized elastomeric material internally reinforced with cords of textile, glass or metal, etc. For reasons of production economy these plies are obtained starting from a continuous piece in which the said cords constitute a kind of axial warp. This piece is subsequently reduced, by transverse cuts, into a plurality of segments which are partially superimposed over one another and then joined along the adjacent edges in such a way as to form the said plies, the opposite ends of which are then joined together on a forming drum to define a tire body or carcass.

From what has been described above it is possible to appreciate that the joining operations necessary for making a carcass are substantially of two types, the first of which involves all the operations for joining the said segments together, which are normally performed on a forming bed, and the second of which involves a single operation for joining the opposite ends of the said ply together, this being performed on the said forming drum.

All the joining operations mentioned above have until now generally been performed by means of motorized joining tools normally comprising two trains of counterposed rollers operable to clamp together the segments or the ply to be joined, and in which each train of rollers includes two rows of rollers disposed on opposite sides of a junction line. For the purpose of pressing the edges to be joined towards one another each roller of each row is disposed substantially parallel to the rollers of the corresponding row of the other train of rollers, and forms a determined angle with a corresponding roller of the other row of the same train.

The above-described known motorized tools generally form part of fixed joining installations such as, for example, those described in U.S. Pat. No. 4,231,836 or French Pat. No. 2,446,170, and are usable solely in combination with a forming table given their size and weight. As far as the joining of the ends of the plies on the forming drum are concerned, however, the small motorized tools formed for this purpose in the past, generally on the basis of what is described in British Pat. No. 1,451,831, have been quickly abandoned or converted into bed mounted tools because of their weight and bulk which is still excessive and which makes them practically impossible to use continuously, particularly for workers used to joining the plies on a forming drum. During this operation, in fact, the operator must hold the joining tool in his hand and advance it along a determined path in contact with the surface of the drum itself by performing movements which are not always easy, the repetition of which for a relatively long time becomes substantially impossible when the weight of the joining tool is more than several kilograms.

An immediate consequence of what has been described above is that, in the manufacturing industry, the flat joining on the bed is normally performed by means of motorized joining tools, while the joining on the forming drum is performed by using hand held manually operable joining tools of the type described in U.S. Pat. No. 3,909,341. Such manually operated tools, although light and simple to use, normally have the disadvantage of not forming a uniform joint both because the force with which the edges to be joined can be made to adhere depends directly on the "not always constant" force applied by the operator, and because they are normally provided with a single train of rollers acting on the outer surface of the ply.

It should be noted, in addition to what has been explained above, that in the said non-motorized tools, the presence of a single train of rollers is not due merely to structural simplification, but to the impossibility of an operator using a manually operated joining tool provided with two trains of counterposed rollers because of the friction which is developed between the rollers and the ply clamped between them. The omission of rollers in contact with the inner surface of the ply to be joined can involve an imperfect adhesion of the edges joined along the said inner surfaces of the ply and consequent rupture thereof during use.

DISCLOSURE OF THE INVENTION

The object of the present invention is that of providing a motorized joining tool which will be provided with two trains of rollers and which at the same time will be sufficiently light and compact for it to be utilized without force, and for a relatively long time, for joining the opposite edges of the plies on a forming drum.

A further object of the present invention is that of providing a motorized joining tool, the mechanical structure of which will be extremely simple and reliable in such a way as to make it advantageously usable not only on a forming drum but also on a forming table instead of the very much more complicated known bed mounted tools previously described.

The said objects are achieved by the present invention in that it relates to a motorized tool for joining plies of tires, particularly reinforced plies of uncured elastomeric material used in tire construction, the tool comprising first and second arms disposed facing one another, a pair of first rolling bodies mounted rotatably on the said first arm and disposed on opposite sides thereof; the said first rolling bodies converging towards one another and being in contact with one another along a section substantially facing the said second arm; at least one pair of second rolling bodies carried rotatably by the said second arm in a position substantially facing the said first arm, and drive means for driving the said first rolling bodies about their axes, characterized by the fact that the said arms are pivoted together at an intermediate point to constitute a pincer-like structure, and resilient means are interposed between the said two arms to urge the said first and second rolling bodies into contact with one another, the said first rolling bodies including two discs having crown gear teeth meshing with one another along the said contacting section, and the said drive means including an output pinion interposed between the said two discs and meshing with the crown gear teeth of one of said discs.

Further characteristics and advantages of the present invention will become apparent from the following description with reference to the attached drawings, which illustrate a non-limiting embodiment.

BRIEF DESCRIPTION OF THE DRAWINGS

FIG. 1 is a perspective view from below of a motorized ply joining tool formed according to the principles of the present invention;

FIG. 2 is a partial view from below of the tool of FIG. 1;

FIG. 3 is a perspective side view of the tool of FIG. 1 with some parts removed for the sake of clarity.

BEST MODE FOR CARRYING OUT THE INVENTION

Figure 4:
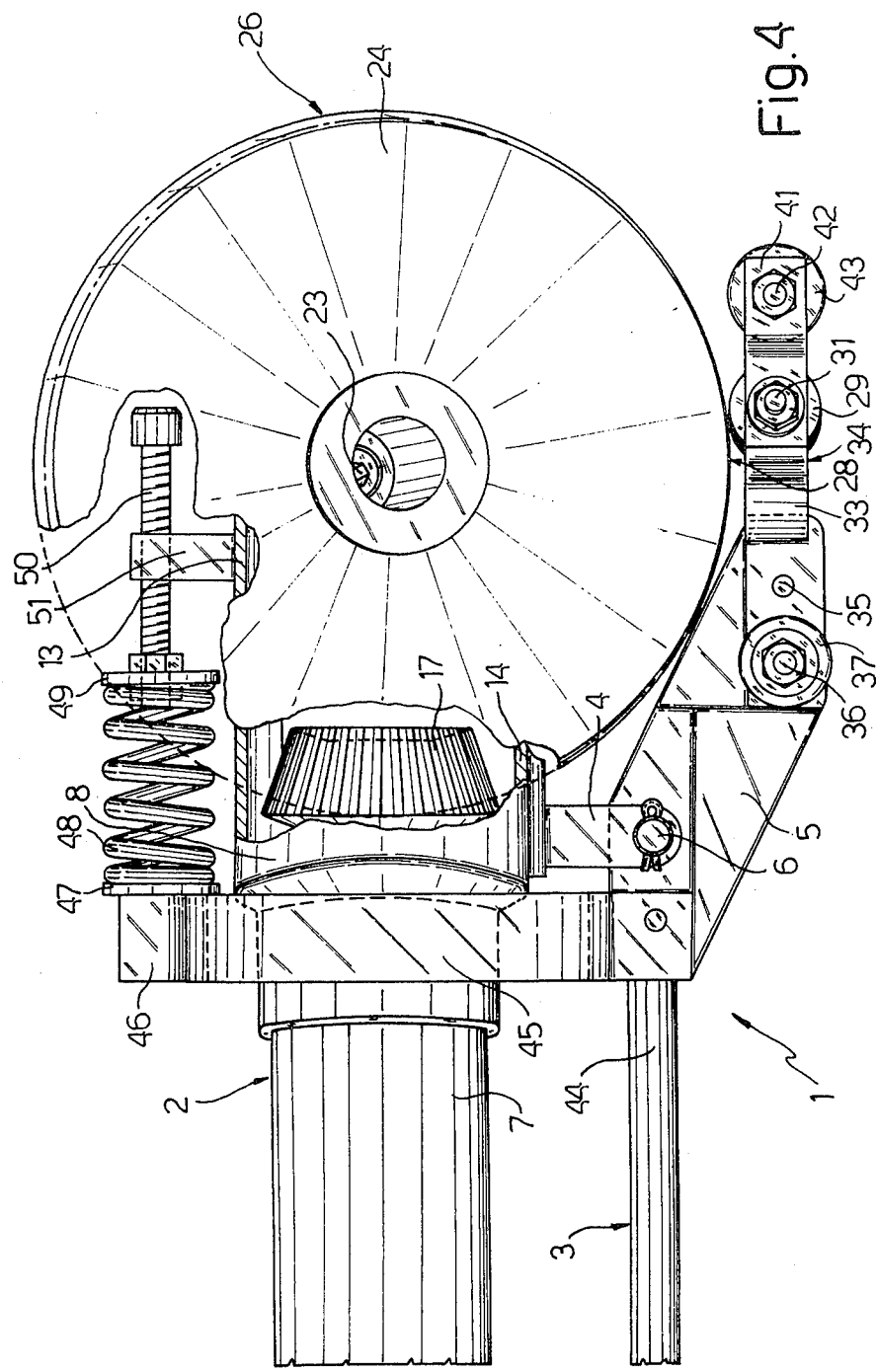
FIG. 4 is a side view, with parts in section and parts removed for the sake of clarity, of the portion of the tool illustrated in FIG. 2.

In FIG. 1 there is illustrated a motorized tool 1 which can be used for joining the adjacent edges (not illustrated) of a ply (not illustrated) mounted on a forming drum (not illustrated), and usable in a likewise advantageous manner for the connection of segments (not illustrated) of ply on a forming table (not illustrated).

The tool 1 has substantially the form of a pincer and includes two arms 2 and 3 the first of which, indicated below as the upper arm, has a form or clevis (FIG. 3) 4 connected laterally thereto. The arms of the fork 4 extend on opposite sides of an intermediate blade-like portion 5 of the arm 3, indicated hereinbelow as the lower arm, and are pivotally connected to it by means of a through pin 6 having an axis substantially perpendicular to those of the arms 2 and 3.

The arm 2 includes two tubular portions 7 and 8 substantially coaxial with one another and disposed essentially on opposite sides of the fork 4. The tubular portion 7 is of substantially cylindrical form and constitutes the outer casing of a pneumatic motor 9 which has, in correspondence with the free end of the tubular portion 7, a coupling 10 which can be connected to a source of compressed air and a filtering projection 11.

As illustrated, particularly in FIG. 3, the tubular portion 8 is preferably connected by means of a resilient collar to the end of the cylindrical portion 7 facing the fork 4 and supports the fork 4 itself, which extends from a point on the outer surface of the portion 8 facing the arm 3. The portion 8 has, centrally, two lateral windows 12 separated from one another on the one hand by an upper section of the wall 13 and on the other by a lower section of the wall 14, and a terminal portion 15 provided with an axial terminal aperture 16. Between the wall sections 13 and 14 there is disposed a conical pinion 17 keyed onto an output shaft 18 of the motor 9. The terminal portion 15 is tapered towards the aperture 16 and has, in section, a substantially trapezoidal form, the smaller base of which is constituted by an arcuate wall 19 facing in the direction of arm 3 and the side walls of which are constituted by two flat plates 20 and 21 inclined and converging both towards the wall 19 and towards the aperture 16, with each of plates 20 and 21 having an internally threaded through hole 22.

As illustrated in FIG. 4, the holes 22 are engaged by respective retaining screws 23 which rotatably connect the discs 24 and 25 to the plates 20 and 21, each of which discs is limited externally by a substantially cylindrical surface 26 and is provided with a peripheral crown of teeth 27 facing the teeth 27 of the other disc. Because of the convergence of the two flat plates 20 and 21 both towards the arm 3 and towards the free end of the terminal portion 15, the two peripheral crown gears 27 mesh with one another along a section 28 disposed substantially facing the arm 3 and slightly displaced towards the free end of the terminal portion 15. One of the crown gears 27 meshes, as well as with the other crown gear, also with the conical pinion 17 through the associated window 12. Along their sections 28 the discs 24 and 25 are disposed substantially tangentially to two externally threaded cylindrical rollers 29 and 30 freely rotatably mounted on respective shafts 31 and 32 carried by opposite arms 33 of a fork 34 connected to one end of the intermediate blade-like portion 5 of the arm 3 by means of two adjacent screws 35 and 36, the second of which also supports two freely rotatable pressure rollers 37 and 38, the axes of which are parallel to that of the pin 6 and disposed on opposite sides of the portion 5.

As illustrated in FIGS. 1 and 3, the shafts 31 and 32 are disposed inclined towards the pin 6 in a position substantially parallel to the respective screws 23, and the facing end surfaces of the rollers 29 and 30 are provided with respective facing teeth 39 meshing with one another and operable to angularly connect the rollers 29 and 30 together.

The rollers 29 and 30, which in a variation not illustrated, are disposed adjacent one or more additional pairs of similar rollers mounted between the arms 33 of the fork 34, have a relatively small diameter normally equal to about one-tenth of that of the discs 24 and 25. Each of the shafts 31 and 32 has a threaded end engaged by an associated connecting nut 40 to the associated arm 33 of a projection 41 which cooperates with the projection 41 of the other arm 33 to support a bolt 42 parallel to the pin 6 and supporting a freely rotatable pressure roller 43. The intermediate portion 5 of the arm 3 carries, at its end opposite that connected to the fork 34, a cylindrical shaft 44 extending in a direction substantially parallel to the tubular portion 7 of the arm 2, and an annular bracket 45 traversed by the tubular portion 7. The part of the bracket 45 which extends above the tubular portion 7 carries a radial outer projection 46 laterally supporting a washer 47 facing the discs 24 and 25 and having an axis substantially parallel to that of the shaft 44. The washer 47 cooperates with the end of a helical spring 48 compressed between the washer 47 itself and a second washer 49 substantially parallel to the washer 47 and supported in an axially adjustable position by a screw 50 extending through a threaded hole formed through a projection 51 parallel to and facing the projection 46 and rigidly connected to the upper part of the end portion 15.

In use, an operator, in order to effect the joining of adjacent edges of a ply on a forming drum, holds the tool 1 like a pincer gripping the tubular portion 7 and the shaft 44, and arranges it in such a way that the edges to be joined are disposed in contact with the opposite surfaces of the blade portion 5. Then by clamping the shaft 44 and the portion 7 against one another and against the action of the spring 48, the operator causes separation of the rollers 29 and 30 from the discs 24 and 25 in such a way as to permit the introduction of the edges of the ply to be joined. Once the shaft 44 is released, and the said edges are clamped between the rollers 29 and 30 and the discs 24 and 25, the operator actuates the motor 9 and pulls the tool 1 towards himself causing the edges of the ply to be joined in a known way which requires no further explanation.

It should be noted, in connection with the tool 1 described above, that its extreme lightness and compactness and, therefore maneuverability, derive principally from the simplicity and functionality of its pincer structure, from the direct transmission without belts or other transmission members between the output of the motor 9 and the discs 24 and 25, and from the arrangement and dimensions of the discs 24 and 25 themselves. In particular, the fact that the discs 24 and 25 have a relatively large diameter is very important since, even utilizing a motor 9 of relatively low power and, therefore, great lightness, it is possible to transmit to the discs 24 and 25 relatively large driving couples.

From the foregoing, it is believed that those familiar with the art will readily recognize and appreciate the novel concepts and features of the present invention. Obviously, while the invention has been described in relation to only one embodiment, numerous variations, changes, substitutions and equivalents will present themselves to persons skilled in the art and may be made without necessarily departing from the scope and principles of this invention. As a result, the embodiment described herein is subject to various modifications, changes, and the like without departing from the scope and spirit of the invention, with the scope thereof being determined solely by reference to the claims appended hereto.

What is claimed is:

1. A motorized tool for joining self adhesive plies, particularly reinforced plies of uncured elastomeric material utilized in tire construction, the tool including first and second arms disposed adjacent one another, a pair of first rolling bodies rotatably mounted on the said first arm and disposed on opposite sides thereof; the said first rolling bodies converging towards one another and being in contact along a section substantially facing the said second arm; at least one pair of second rolling bodies carried rotatably by the said second arm in a position substantially facing the said first arm, and drive means for driving the said first rolling bodies about their axes, characterized by the fact that the said arms are pivoted together at an intermediate point to constitute a pincer structure, and resilient means are interposed between the said two arms to urge the said first and second rolling bodies into contact with one another; the said first rolling bodies comprising two discs having peripheral crowns of teeth meshing with one another along the said contact section, and the said drive means including an output pinion interposed between the said two discs and meshing with one of the said crowns of teeth.

2. A tool according to claim 1, characterized by the fact that the said first rolling bodies have a diameter greater than that of the said second rolling bodies.

3. A tool according to claims 1 or 2, characterized by the fact that the said first rolling bodies have a diameter which is about ten times that of the diameter of the said second rolling bodies.

4. A tool according to claims 1 or 2, characterized by the fact that the said first arm has a tubular structure; the said drive means includes a motor housed within the said first arm and coaxial with the said pinion.

5. A tool according to claim 4, characterized by the fact that the said pinion is attached to an output shaft of the said motor.

* * * * *